US007172701B2

(12) United States Patent
Gaid et al.

(10) Patent No.: US 7,172,701 B2
(45) Date of Patent: Feb. 6, 2007

(54) WATER TREATMENT METHOD USING AN INORGANIC POWDER REAGENT WITH HIGH SPECIFIC SURFACE AREA INCLUDING A STEP OF RECYCLING SAID REAGENT

(75) Inventors: Abdelkader Gaid, Paris (FR); Mickael Uyttewaal, Saint-Maur des Fosses (FR); Annie Tazi-Pain, Asnieres (FR)

(73) Assignee: OTV SA S.A. (FR)

( * ) Notice: Subject to any disclaimer, the term of this patent is extended or adjusted under 35 U.S.C. 154(b) by 112 days.

(21) Appl. No.: 10/530,799

(22) PCT Filed: Nov. 21, 2003

(86) PCT No.: PCT/FR03/03455

§ 371 (c)(1),
(2), (4) Date: Apr. 8, 2005

(87) PCT Pub. No.: WO2004/048277

PCT Pub. Date: Jun. 10, 2004

(65) Prior Publication Data

US 2006/0000771 A1 Jan. 5, 2006

(30) Foreign Application Priority Data

Nov. 22, 2002 (FR) .................... 02 14697

(51) Int. Cl.
*C02F 1/28* (2006.01)
*C02F 3/02* (2006.01)
(52) U.S. Cl. .............. 210/616; 210/631; 210/663; 210/691; 210/694; 210/151; 210/195.2; 210/202; 210/903

(58) Field of Classification Search ............... 210/616, 210/625, 631, 650, 663, 670, 690, 691, 694, 210/151, 195.1, 195.2, 202, 205, 321.6, 903, 210/787, 512.1
See application file for complete search history.

(56) References Cited

U.S. PATENT DOCUMENTS

| 4,076,615 A | * | 2/1978 | Olesen et al. ............... 210/631 |
| 4,610,792 A | * | 9/1986 | Van Gils et al. ............ 210/694 |
| 4,810,386 A | * | 3/1989 | Copa et al. .................. 210/616 |
| 4,919,815 A | * | 4/1990 | Copa et al. .................. 210/616 |
| 4,956,093 A | * | 9/1990 | Pirbazari et al. ............ 210/616 |
| 5,068,036 A | * | 11/1991 | Li et al. ..................... 210/616 |
| 5,204,001 A | * | 4/1993 | Tonelli et al. ............... 210/151 |
| 5,254,253 A | * | 10/1993 | Behmann .................. 210/195.2 |

(Continued)

FOREIGN PATENT DOCUMENTS

FR 2737202 * 1/1997

(Continued)

*Primary Examiner*—Christopher Upton
(74) *Attorney, Agent, or Firm*—Coats & Bennett, P.L.L.C.

(57) ABSTRACT

A method of treating water including mixing the water with an inorganic powder reagent for reducing the content of organic matter. The water, after being mixed with the inorganic powder reagent, is subjected to a membrane separation step that produces blow off products that are then separated into two fractions: a first fraction containing a majority portion of the powder reagent in a first stream of water, and a second fraction containing a majority portion of inorganic matter not absorbed on the inorganic powder reagent rejected by the membrane separation step in a second stream of water.

29 Claims, 1 Drawing Sheet

U.S. PATENT DOCUMENTS 5,364,534 A * 11/1994 Anselme et al. ......... 210/195.2
5,552,055 A * 9/1996 Arato ......................... 210/694
5,932,099 A * 8/1999 Cote et al. .................. 210/631

FOREIGN PATENT DOCUMENTS

| FR | 2770210 | * | 4/1999 |
| JP | 6-226294 | * | 8/1994 |
| JP | 2002-192184 | * | 7/2002 |

* cited by examiner

WATER TREATMENT METHOD USING AN INORGANIC POWDER REAGENT WITH HIGH SPECIFIC SURFACE AREA INCLUDING A STEP OF RECYCLING SAID REAGENT

This application is a U.S. National Stage application of PCT Application No. PCT/FR03/03455, with an international filing date of Nov. 21, 2003. Applicant claims priority based on French application serial No. 02 14697 filed Nov. 22, 2002.

BACKGROUND OF THE INVENTION

This invention relates to a method of treating water. More precisely, the invention relates to a physicochemical water treatment process including a step to bring water into contact with an inorganic powder reagent with high specific surface area particularly for reducing their content of organic matter.

The invention is equally applicable to methods of treating water for drinkability and purification, and as a guide can be applicable to treatment of a high quality water or for refining water that has already been treated in an existing installation.

In the field of the invention, it is known that water containing pollutants in solution can be treated by using powder reagents such as adsorbents, this treatment possibly being combined with an ultra-filtration or micro-filtration step in a manner that is also known.

These reagents are usually added at the same time as the clarification step, or on the upstream side of membrane filtration means.

Obviously, these powder reagents have physical hardness, abrasiveness and density characteristics such that they can be fluidised in water making them compatible with the filtration membranes used.

The powder reagents used include particularly Powdered Activated Carbon (PAC).

PAC is an adsorbent that eliminates pesticides and any other dissolved organic matter.

PAC is an expensive reagent and therefore induces relatively high operating costs.

Furthermore, the use of such a powder reagent on the upstream side of ultra-filtration or micro-filtration membranes introduces a disadvantage related to clogging of membranes by the reagent used and/or by the organic matter.

BRIEF SUMMARY OF THE INVENTION

The objective of the invention is to overcome the disadvantages of prior art.

More precisely, the objective of the invention is to propose a water treatment method including the use of an inorganic powder reagent like that mentioned above or a membrane filtration step to reduce operating costs.

Another objective of the invention is to provide such a method for reducing clogging of membrane separation means.

Another objective of the invention is to provide such a method that can be adapted as a function of the water quality to be treated.

Another objective of the invention is to provide such a method that is easy to design and easy to implement.

These and other objectives that will become clearer later are achieved with the invention, the purpose of which is a method of treating water for purification and/or drinkability, of the type comprising at least one step bringing the said water into contact with at least one inorganic powder reagent with high specific surface area, this step possibly being carried out while stirring (by any means and particularly mechanical or air injection means), particularly for reducing the content of organic matter or micro pollutant in the said water, and at least one membrane separation step, characterised in that it comprises a step for treating the blow-off products derived from the said membrane separation step to separate the said blow-off products into at least two fractions:

a first fraction containing the major part of the powder reagent (in other words more than 60% by mass) in a low water flow rate, in other words less than 40% of the blow-off flow rate, preferably 20% of the blow-off flow rate, that contains organic matter and micro pollutants;

a second fraction containing the major part of organic matter not adsorbed on the reagent rejected by the membranes and concentrated in the blow-off products, in a larger water flow rate, preferably 4 to 20 times more than the low flow rate mentioned above, the said first fraction being reinjected into the said water on the upstream side of the said step consisting of bringing the said water into contact with the said powder reagent.

The said second fraction containing the major part of organic matter not adsorbed on the reagent, is preferably discarded into the drain or towards a special treatment means that may for example be a coagulation—flocculation—settlement means located on the upstream side of the step bringing the water and the powder reagent into contact or any other adapted type of settlement tank or basin.

Thus, the invention can efficiently recycle the powder reagent and therefore optimise its use. Consequently, operating costs can be significantly reduced.

In one variant of the invention, the powder reagent is used as a support for a nitrifying biomass and/or capable of treating the biodegradable organic carbon located in the water, and air is injected into the area in which water is brought into contact with the powder reagent. This air is used to supply the oxygen necessary for the biology installed on the powder support and to maintain the powder reagent in suspension. Membranes may possibly be immersed directly in the area in which water is brought into contact with the powder reagent or may be located in a later area.

The treatment of blow-off products composed of a powder reagent mixed in water with dissolved organic matter or organic matter in suspension derived from membrane filtration in order to divide them into two fractions, decouples the recycling ratio of the powder reagent and organic matter not absorbed on the reagent.

The consequence is that the capacities of the powder reagent are used optimally, and consumptions of the powder reagent can then be reduced.

If the powder reagent and organic matter not adsorbed on the reagent are not separated before the powder reagent is recycled, a larger quantity of organic matter will be recycled in the system that will more quickly saturate the active reagent sites, for example powdered activated carbon sites, and will reduce the specific capacity of this reagent to treat the micro pollutants for which it is used.

Note that for the purposes of the description of this invention, an "inorganic powder reagent with high specific surface area" means any powder reagent that could react with one of the compounds present in the water to be treated (for example a micro pollutant) either by adsorption or by ion exchange, in order to reduce the content of these compounds in the water involved.

According to one preferred solution, the said powder reagent is Powdered Activated Carbon (PAC).

Apart from its capacity to collect organic matter and act as a possible support for a nitrifying biomass and/or a biomass that treats Biodegradable Dissolved Organic Carbon, PAC is particularly advantageous as a compound that adsorbs micro-pollutants and particularly pesticides. Therefore PAC is particularly useful during periods of the year in which water has a high content of these compounds, particularly in the spring.

According to other possible embodiments, the powder reagent can be chosen from the group composed of zeolites, clays and ion exchanging resins, or it may comprise a mix of these compounds, possibly in the presence of PAC.

According to one advantageous solution, the said treatment step of the said blow-off products comprises a hydraulic separation step. In this case, the said hydraulic separation step is preferably done using at least one hydrocyclone.

This type of separation means enables recovery of much of the powder reagent (at least 60% by mass for reasonable pressures).

In a hydrocyclone, the overflow conventionally represents 80% of the supply flow. The remaining 20% are evacuated in underflow. Since the dissolved organic matter is not separated in this type of apparatus, 80% of it is evacuated in overflow and only 20% returns in underflow, adsorbed on most of the PAC, according to the invention being returned into the tank in which water is brought into contact with PAC on the upstream side of the membrane filtration.

According to a first approach, the said blow-off products derived from the said membrane separation are collected continuously.

According to a second approach, the said blow-off products derived from the said membrane separation are collected periodically. In this case, the interval at which the said blow-off products are collected preferably depends on the concentration of powder reagent in the said water present in the said step in which the said water is brought into contact with the said powder reagent.

Thus, by controlling the intervals and also the volume of these blow-off products, the concentration of PAC in the contact tank can be increased particularly in order to obtain a buffer effect with regard to pesticides present in the water to be treated, or to keep a sufficient concentration of biomass in the contact tank to treat the ammonia or biodegradable organic carbon.

Advantageously, the process comprises at least one step for extraction of the said used powder reagent. In this case, the said extraction step is preferably done on the upstream side of the said separation step of the said blow-off products.

Note that the tank in which water is brought into contact with the PAC could also be blown off, particularly in order to evacuate some of the used PAC.

According to a first variant, the said membrane separation step is performed using pressurised membranes.

According to a preferred variant, the said membrane separation step is performed using immersed membranes, preferably aerated continuously or periodically.

Immersed membranes have the advantage of inducing lower energy consumption than pressurised membranes. The result is to further reduce operating costs of the installation using the process according to the invention.

According to a first embodiment, the said second fraction is evacuated.

According to a second embodiment, the said second fraction is reinjected into the said water to be treated, on the upstream side of a gravity separation step that can take place before the step in which the water is brought into contact with the powder reagent to be treated in it (possibly with the addition of a coagulating and/or flocculating agent).

The invention also relates to an installation for use of a method like that described above, comprising at least one tank in which the said water is brought into contact with an inorganic powder reagent with high specific surface area and at least one membrane separation unit, characterised in that it comprises at least one hydraulic separation unit for blow-off products derived from the said membrane separation unit, the said hydraulic separation unit separating the said blow-off products into at least two fractions:

- a first fraction containing the major part of the powder reagent (in other words more than 60% by mass) in a low water flow rate, in other words less than 40% of the blow-off flow rate, preferably 20% of the blow-off flow rate, that contains organic matter and micro pollutants;
- a second fraction containing the major part of organic matter not adsorbed on the reagent rejected by the membranes and concentrated in the blow-off products, in a larger water flow rate, preferably 4 to 20 times more than the low flow rate mentioned above, and in that it comprises means of conveyance of the said first fraction to the said contact tank.

According to a preferred solution, the said hydraulic separation unit comprises at least one hydrocyclone.

And as mentioned above, the hydrocyclone is particularly efficient in that it enables recovery of much of the powder reagent.

According to a first approach, the said membrane separation unit comprises at least one filtration tank integrating at least one immersed membrane, preferably provided with aeration means under the membranes.

According to a second approach, the said membrane separation unit comprises at least one filtration tank integrating at least one pressurised membrane.

Advantageously, the said installation comprises a storage tank for the said blow-off products derived from the said membrane separation unit.

The result is thus a buffer stock of blow-off products derived from the membrane separation unit, making use of this storage tank, so that these blow-off products can be treated continuously or periodically.

Preferably, the said installation includes means of extraction of the said used powder reagent.

Consequently, if necessary, the powder reagent used in the installation can be renewed.

In this case, the said extraction means are advantageously provided on the said conveyance means and/or the said contact tank.

According to a first variant, the installation includes means of evacuating the said second fraction.

According to a second variant, the installation includes means of evacuating the said second fraction.

According to a second variant, the installation includes means of conveyance of the said second fraction to a gravity separation unit installed on the upstream side of the tank bringing water into contact with the powder reagent(s) and preferably provided with coagulation and/or flocculation means before gravity separation.

This second variant can further reduce the production of undesirable effluents.

Other characteristics and advantages of the invention will become clearer after reading the following description of a preferred embodiment of the invention, given as an illustrative example without being in any way limitative, with reference to the single FIGURE that diagrammatically shows an installation for use of a water treatment process according to the invention.

DESCRIPTION OF THE PREFERRED EMBODIMENT

Figure 1:
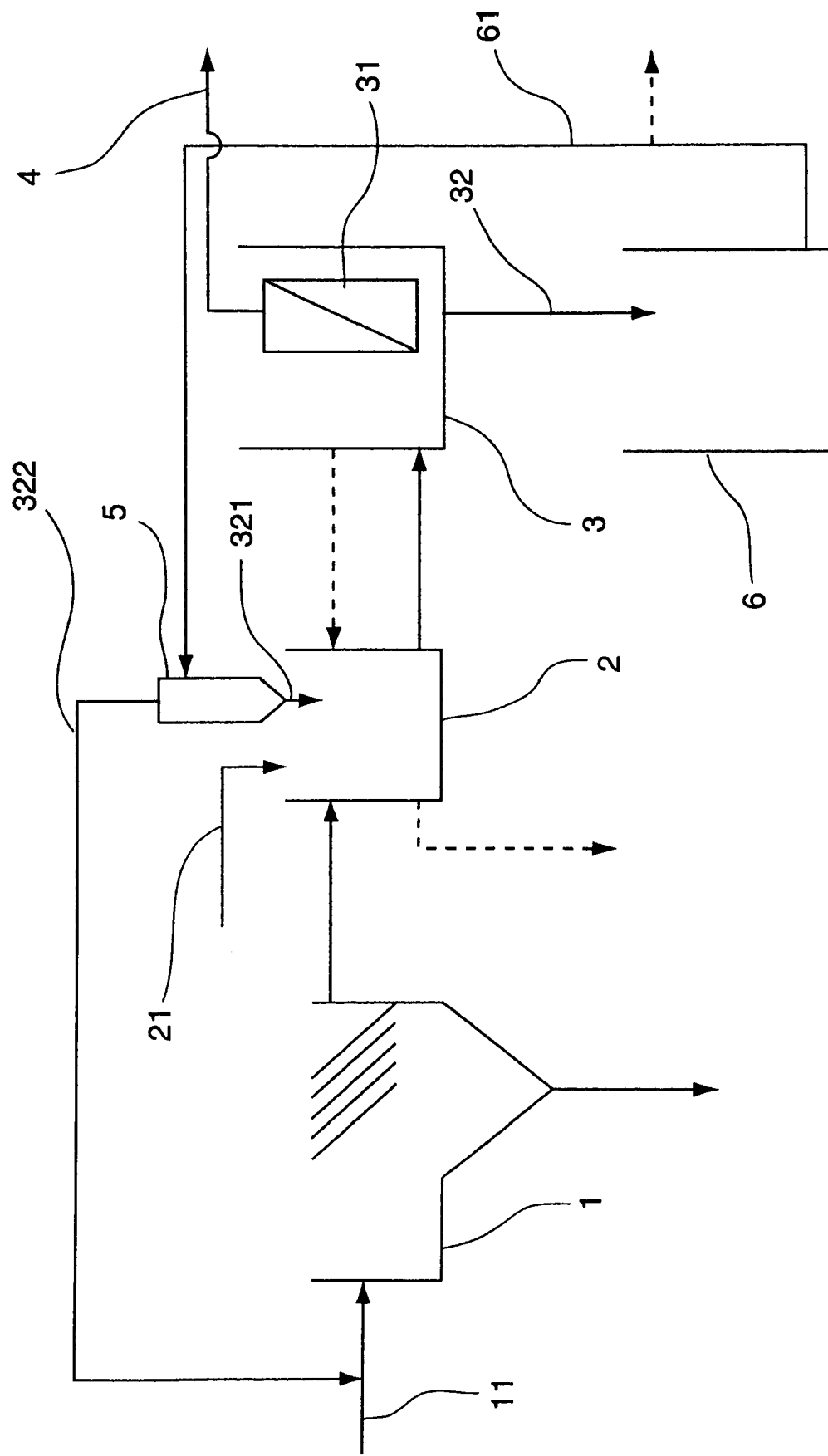
FIG. 1 shows a diagram of a process and system according to the invention.

With reference to FIG. 1, an installation for use of a process according to the invention includes:
- a lamellar clarifier 1 for implementation of a gravity separation step for the water to be treated, with or without the addition of a coagulating or flocculating reagent;
- a contact tank 2, for implementation of a step to bring water into contact with the powder reagent (in this case PAC); this contact tank may be stirred mechanically or by air blowing 7;
- a filtration tank 3, for implementation of a membrane separation step using ultra-filtration or micro-filtration membranes 31.

According to one possible embodiment, such an installation may be placed after coagulation, settlement and filtration equipment enabling pre-treatment of water, particularly in the case of treatment of surface water.

Conventionally, the water to be treated is brought to the tank 3 either directly or through the clarifier 1 through conveyance means 11, the overflow from the clarifier 1 is then sent to contact tank 2, and the water is then sent to tank 3. The water then passes through immersed membranes 31, the water thus treated being evacuated through a pipe 4.

Note that according to one possible variant, the membrane separation may be made using pressurised membranes.

Furthermore, according to another possible embodiment, the step in which water is brought into contact with PAC and the membrane filtration step may be made within the same reactor, for example of the type described in U.S. Pat. No. 5,932,099.

According to the invention, the blow-off products 32 derived from membrane separation are conveyed to a hydrocyclone 5 through which they are separated into two fractions:
- one fraction 321 containing a small part of the received flow and the major part of the PAC that absorbed part of the organic matter, this fraction 321 being reinserted into the contact tank 3;
- a fraction 322 corresponding to the overflow from the hydrocyclone 5, evacuating the major part of the water that contains non-adsorbed dissolved organic matter or organic matter in suspension received by the hydrocyclone.

According to this embodiment, this fraction 322 is reinserted at the conveyance means 11 of the water to be treated, and therefore once again passes through a complete treatment cycle to retrieve the maximum amount of water while reducing the quantity of organic matter, preferably with the injection of coagulating and flocculating reagents.

However, according to another possible embodiment, this fraction 322 may be evacuated from the installation without any new treatment being applied to it.

Furthermore, as shown in FIG. 1, a storage tank 6 is provided for membranes blow-off products.

Tank 3 may thus be blown off periodically, and the blow-off products can then be stored and/or directed to the hydrocyclone depending on the concentration of PAC in the contact tank 2.

Note that used PAC extraction blow-off products are provided on the pipe 61 on the upstream side of the hydrocyclone 5, and on the contact tank 2.

At the same time, new PAC may be added into the contact tank 2 using addition means 21.

Comparative tests were carried out over several days to help better understand this invention, and the results are given below in the form of a table; these tests were carried out on water from the river Seine coagulated with WAC settled and filtered on sand at 15 m/h. This water was then mixed with Picasorb PAC 16.

|  | Test without recirculation | Test according to the invention |
| --- | --- | --- |
| PAC ratio (ppm) | 10 | 10 |
| Input organic matter (UV measurement) | 4.3 | <4.0 |
| Organic Matter reduction percent (%) | 30 | 60–70 |
| Atrazine before addition of PAC (ng/l) | 911–2000 | 1000–1800 |
| Atrazine after addition of PAC (ng/l) | 400–850 | Less than 70 (detection limit) |

The invention claimed is:

1. A method of treating water, comprising:
   a. contacting the water with at least one inorganic powder reagent with high specific surface area for reducing the content of organic matter in the water; and
   b. a membrane separation step including treating blow off products derived from the membrane separation step by separating the blow off products into at least two fractions:
      i. a first fraction containing a majority of the inorganic powder reagent in a first stream of water;
      ii. a second fraction containing a majority of organic matter not absorbed by the inorganic powder reagent rejected by the membrane separation step and concentrated in the blow off products in a second stream of water having a flow rate that exceeds the first stream of water; and
      iii. wherein the first fraction containing a majority of the inorganic powder reagent is rejuvenated in the water on the upstream side of where the water is treated with the inorganic powder reagent.

2. The method of treating water of claim 1 wherein the powder reagent is powder activated carbon (PAC).

3. The method of claim 1 including a gravity separation step that takes place before the water is brought into contact with the inorganic powder reagent.

4. The method of claim 3 wherein the gravity separation step is preceded by a flocculation or coagulation step.

5. The method of treating water of claim 4 wherein the second fraction is rejuvenated in the water to be treated on the upstream side of said gravity separation step.

6. The method of claim 1 wherein the inorganic powder reagent is used as a support for a nitrifying biomass, and air is injected during the step in which water is brought into contact with the inorganic powder reagent.

7. The method of treating water of claim 1 wherein the blow off products are separated by a hydraulic separation step.

8. The method of treating water of claim 7 wherein the separation step utilizes at least one hydrocyclone.

9. The method of treating water of claim 1 wherein the blow off products derived from the membrane separation step are collected continuously.

10. The method of treating water of claim 1 wherein said blow off products derived from the membrane separation step are collected periodically.

11. The method of treating water of claim 10 wherein the intervals at which the blow off products are collected depend on the concentration of the inorganic powder reagent in the water is brought into contact with the inorganic powder reagent.

12. The method of treating water of claim 1 wherein the method comprises at least one step of extracting the used inorganic powder reagent.

13. The method of treating water of claim 12 wherein said extraction step occurs on the upstream side of the membrane separation step.

14. The method of treating water of claim 1 wherein said membrane separation step is achieved using pressurized membranes.

15. The method of treating water of claim 1 wherein said membrane separation step is performed using immersed membranes.

16. The method of treating water of claim 1 wherein the second fraction is evacuated.

17. The method of claim 1 wherein the flow rate of the second stream of water exceeds the flow rate of the first stream of water by four to twenty times.

18. A system for treating water comprising:
   a. at least one chamber for mixing the water with an inorganic powder reagent for reducing the content of organic matter in the water;
   b. at least one membrane separation unit comprising at least one hydraulic separation unit and wherein the hydraulic separation unit separates blow off products derived from the membrane separation unit into at least two fractions: a first fraction containing a majority of the inorganic powder reagent in a first water stream; a second fraction containing a majority of organic matter not absorbed by the inorganic powder reagent rejected by the membrane separation unit and concentrated in the blow off products in a second water stream; and a connector for permitting the first fraction to be conveyed to the chamber where the water is mixed with the inorganic powder reagent.

19. The system of claim 18 comprising a gravity separation unit installed on the upstream side of the chamber where the water is mixed with the inorganic powder reagent.

20. The system of claim 19 including a coagulation and/or flocculation unit on the upstream side of the gravity separation unit.

21. The system of claim 19 including means for conveying the second fraction to the gravity separation unit.

22. The system of claim 18 further comprising and air injector for maintaining the inorganic powder reagent in suspension and an oxygen supply inlet for supplying oxygen for biologically treating the water.

23. The system of claim 18 wherein the hydraulic separation unit comprises at least one hydrocyclone.

24. The system of claim 18 wherein said membrane separation unit comprises at least one filtration tank having at least one immersed membrane.

25. The system of claim 18 wherein the membrane separation unit comprises at least one filtration tank having at least one pressurized membrane.

26. The system of claim 18 including a tank for the storage of the blow off products derived from the membrane separation unit.

27. The system of claim 18 comprising means for extracting the used inorganic powder reagent.

28. The system of claim 27 wherein the extraction means is provided on a conveyor means or in conjunction with the chamber where the water is mixed with the inorganic powder reagent.

29. The system of claim 18 including means for evacuating the second fraction.

* * * * *